United States Patent [19]
Wiederkehr et al.

[11] Patent Number: 6,086,050
[45] Date of Patent: Jul. 11, 2000

[54] APPARATUS FOR PULLING A TRACTION CABLE THROUGH AN UNDERGROUND PIPE

[75] Inventors: Walter Wiederkehr, Gryon; Gérard Plumettaz, Bex, both of Switzerland

[73] Assignee: Plumettaz S.A., Bex, Switzerland

[21] Appl. No.: 09/058,240

[22] Filed: Apr. 10, 1998

[30] Foreign Application Priority Data

Apr. 11, 1997 [EP]  European Pat. Off. .............. 97810215

[51] Int. Cl.[7] .................................................. B63B 35/03
[52] U.S. Cl. ................... 254/134.3 R; 254/266; 254/284; 254/285; 254/286; 254/326; 254/327; 254/325; 254/382
[58] Field of Search ............................ 254/134.3 R, 266, 254/284, 285, 286, 326, 327, 325, 382

[56] References Cited

U.S. PATENT DOCUMENTS

| | | | |
|---|---|---|---|
| 644,884 | 3/1900 | Wrigley | 254/134.3 R |
| 1,735,301 | 11/1929 | Short | 254/134.3 R |
| 2,731,233 | 1/1956 | Lindsay | 254/327 |
| 3,226,088 | 12/1965 | Habighorst | 254/134.3 R |
| 4,899,988 | 2/1990 | Mills | 254/134.3 R |
| 5,273,257 | 12/1993 | Perkins | 254/323 |
| 5,374,174 | 12/1994 | Long, Jr. . | |
| 5,507,597 | 4/1996 | McConnell . | |
| 5,664,765 | 9/1997 | Pickrell | 254/134.3 R |

FOREIGN PATENT DOCUMENTS

| | | |
|---|---|---|
| 0 445 326 A1 | 9/1991 | European Pat. Off. . |
| 9-25092 | 7/1995 | Japan . |
| 2 270 963 | 3/1994 | United Kingdom . |
| 2 291 690 | 1/1996 | United Kingdom . |

*Primary Examiner*—Donald P. Walsh
*Attorney, Agent, or Firm*—Oliff & Berridge, PLC

[57] ABSTRACT

A pulling apparatus includes a frame having a securing stirrup for securing a beam. The beam is provided at one end with a return pulley. Due to the structure of the securing stirrup, the tractive forces are transferred completely to the beam and the frame so that the means for securing the apparatus to the ground can be minimized. Such a design easily allows the beam to be set at an angle when the pipe is off center. The apparatus may also be easily placed in a cable chamber for operation.

13 Claims, 2 Drawing Sheets

APPARATUS FOR PULLING A TRACTION CABLE THROUGH AN UNDERGROUND PIPE

The content of Application No. 97810215.0 filed Apr. 11, 1997 in Europe is hereby incorporated by reference.

BACKGROUND OF THE INVENTION

1. Field of the Invention

This invention relates to operations on underground pipelines, and more particularly to apparatus for pulling a traction cable, of the type having a frame supporting means for pulling the cable.

2. Description of Related Art

In view of the trouble and expense occasioned by civil engineering work extending along an excavation when it is desired to carry out an operation on an existing pipeline, especially in order to replace it, various means have been proposed, e.g., operations solely in the vicinity of the manholes of the pipeline, whereby both the expense and the disadvantages of such construction sites may be substantially reduced.

In general, the operation takes place between two manholes disposed at ground level at each end of the pipeline on which the operation is to be carried out; a first manhole, the entry manhole, is intended to introduce the objects or tools necessary for the operation, while the second manhole, the exit manhole, is generally provided with a winch or other traction means responsible for pulling the object or tool along the pipeline by means of a cable. According to the type of operation, particularly when the tool is an air hammer intended to break up the pipe to be replaced, the tractive force may be considerable, up to 200 kN or more.

For such a pull, particular precautions must be taken in connection with the winch, especially as regards its stability and the way it is secured over the exit manhole or at the end of the pipeline. One solution is to make a large excavation in the vicinity of the exit manhole in which to place the winch, usually mounted on a trailer, so as to position the entry axis of the cable on the drum opposite the end of the pipe. This solution is relatively costly because of the expense of the necessary excavation.

Then, the winch has been kept on the surface and the necessary return pulleys installed, by means of independent pulleys, so as to guide the traction cable from the end of the pipe to the drum. Though this solution may be advantageous when the tractive force involved is low, it is not at all suitable in the case under consideration here in view of the extensive securing facilities required, both for the winch and the pulleys.

An improvement on the preceding process has been to use a strong metal beam to connect the winch frame to the return pulley disposed directly opposite the end of the pipe in order to take up the vertical stress between these two elements. Until now, the proposed solutions of this type have included connecting the beam to the winch frame by detachable or positionable fixing means, which has limited the amount of force which could be transmitted from the beam to the frame.

Since the axis of the pipe is very often shifted relative to the vertical axis of the chamber, i.e., relative to the center of the manhole, the beam must be disposed at an slant in order to compensate for this shifting. Thus, a weak attachment between the beam and the frame cannot absorb the torsional stress applied to it.

SUMMARY OF THE INVENTION

It is therefore the object of this invention to provide improved cable-pulling apparatus not possessing the drawbacks of known apparatus, having means for fixing the beam to the frame whereby the major forces considered here can be absorbed. The disclosed arrangement is capable of working with the beam disposed at an angle to a vertical axis and of being disposed at the bottom of a chamber.

To this end, the apparatus for pulling a traction cable according to the present invention, of the type initially mentioned, includes a means for securing a component for absorption of tractive stress, this securing means forming an integral part of the frame.

Because the pull can be borne essentially by the beam, it is no longer necessary for the pulling apparatus to be heavy and cumbersome; consequently, it can be compact enough to be disposed at the bottom of the chamber, directly opposite the end of the pipe.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF PREFERRED EMBODIMENTS

Preferred embodiments of the invention will be described in detail hereinafter with reference to the accompanying drawings.

Figure 1:
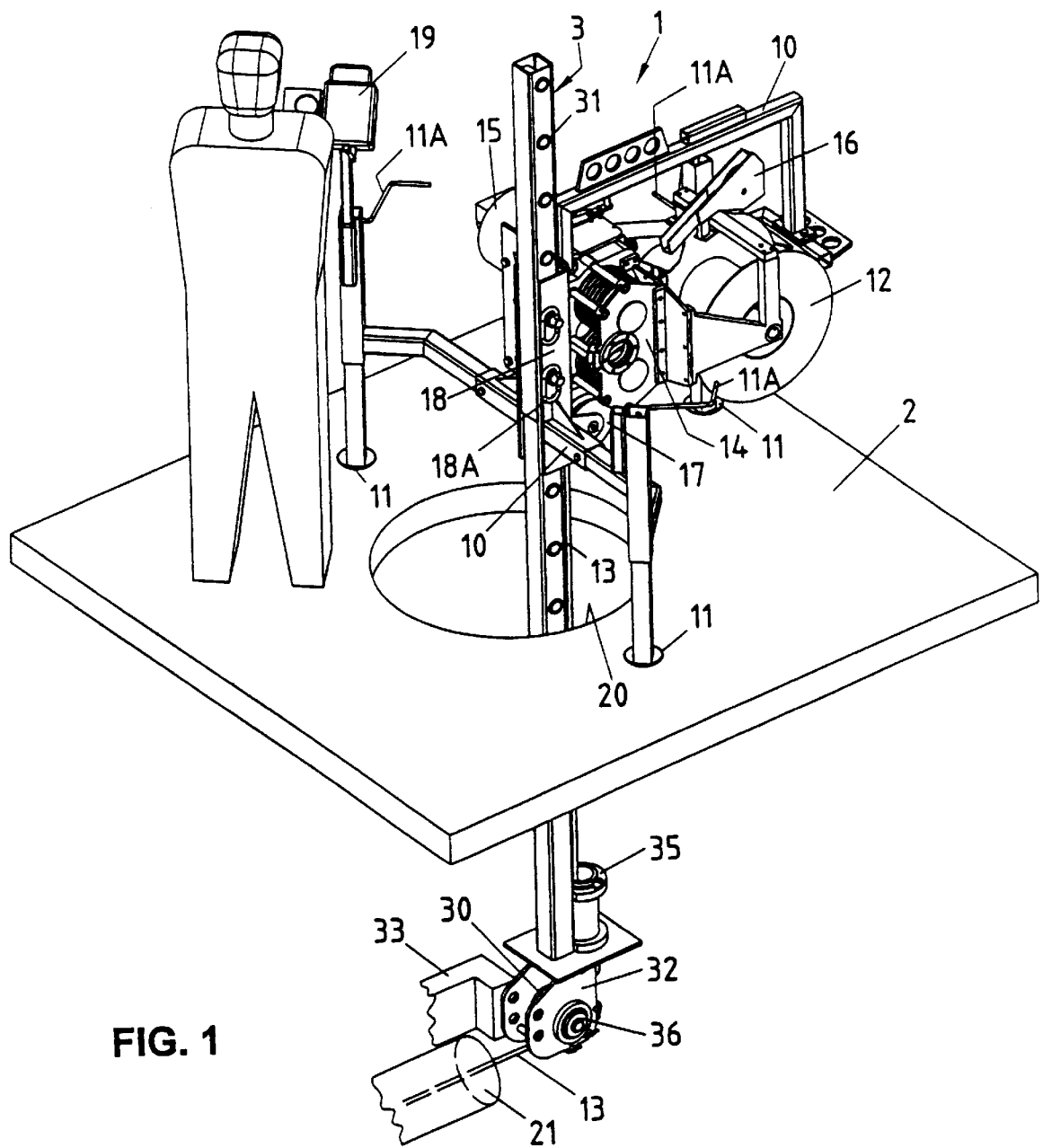
FIG. 1 is a perspective view showing the inventive apparatus in a first working position.

A pulling apparatus 1 illustrated in FIG. 1 is disposed above the surface 2 of the ground, near a manhole 20 of a chamber opening into which is a pipe 21 disposed below the surface 2 of the ground. A cable 13 is to be pulled through pipe 21. Apparatus 1 is made up of a frame 10, resting on three legs 11. It further comprises a drum 12 about which cable 13 is to be wound, as well as a known capstan 14, for applying traction to cable 13. Drum 12 and capstan 14 are driven rotatingly by known means e.g., by one or more hydraulic motors 15, it being possible to envisage other types of drive means as well, as need be. A first guide roller 16 ensures the passage of cable 13 between capstan 14 and drum 12. Legs 11 and their supports can be uncoupled or dismantled from frame 10 for a reason to be explained below.

A beam 3, disposed substantially vertically, permits absorption of the essentially vertical tractive force of cable 13. For this purpose, the lower end of beam 3 is provided with a first return pulley 30, converting the generally horizontal movement of cable 13 within pipe 21 into an essentially vertical movement along beam 3. A second guide pulley 17 disposed on frame 10, opposite capstan 14, then guides cable 13 over the intake of capstan 14. Frame 10 comprises a securing stirrup 18, U-shaped in this embodiment, rigidly fixed to frame 10 and forming an integral part thereof. A longitudinal portion of beam 3 is disposed within stirrup 18. Beam 3 includes a series of regularly spaced transverse holes 31, at least two corresponding holes also appearing on the two side faces of stirrup 18. Thus, by inserting one or two pins 18A through holes 31 of beam 3 aligned with the holes in stirrup 18, it is possible to join beam 3 firmly to frame 10. Return pulley 30 is positioned opposite pipe 21, firstly, by using a beam 3 of a suitable length, then by making a first rough adjustment, selecting the holes 31 by means of which pulley 30 may be brought closest to pipe 21, and finally by acting upon means 11A for adjusting the level of legs 11 of frame 10. In the embodiment shown, these level-adjustment means take the form of cranks 11A acting in a known manner to adjust the level of legs 11. Other level-adjusting means may be envisaged, e.g., rack-type, pneumatic, or hydraulic means.

It will be noted that as shown in FIG. 1, return pulley 30 is shown as disposed within a second stirrup 32, securing holes being provided on both side faces thereof. These securing holes are for fixing support means 33, only one of which is shown, resting against a stable surface surrounding pipe 21. Support means 33, connected to stirrup 32, thus permit absorption of the longitudinal, usually horizontal, tractive stress on cable 13. Since beam 3 is rigidly fixed to frame 10 in the manner previously described, the vertical force is supported entirely between return pulley 30 and guide pulley 17 or capstan 14. Thus, all tractive forces are completely absorbed by support means 33, beam 3, and frame 10, so that it is not necessary to specially secure apparatus 1 above the ground.

Beam 3 has been described and shown here as being of substantially quadrangular cross-section, but any other appropriate shape may be chosen instead, e.g., a circular cross-section, or else a T or I rail, with the shape of stirrup 18 being adapted accordingly. Likewise, rather than having a plurality of beams of different lengths to adapted to the depth of the pipeline, it is possible for extensions to be provided on the beam for adjusting it to the desired length.

Stirrup 32 bearing return pulley 30 is preferably pivoted on a vertical shaft 35 so that pulley 30 may be positioned opposite the end of pipe 21. This adjustment of position usually take place before support means 33 are mounted. Shaft 35 of pulley is advantageously provided with a known shock-absorber 36 in order to absorb jolts transmitted to cable 13 by the object it is pulling through pipe 21; this precaution is particularly advantageous when the object being pulled is an air hammer breaking up pipe 21.

The end of pipe 21 usually does not open out into the chamber along an axis crossing an axis perpendicular to the ground and passing through the center of manhole 20. It is then necessary to position beam 3 at an slant so that pulley 30 will be opposite the end of pipe 21, while the other end of beam 3 goes out through manhole 20. Since beam 3 is fastened so firmly to securing stirrup 18, and since the latter forms part of frame 10, the fixing of beam 3 is strong enough to withstand the torsional forces which are then applied to it. The angle of beam 3 is easily adjusted by positioning frame 10 with the aid of the means for adjusting the level of legs 11—in this embodiment, cranks 11A. An angular variation of beam 3 of ±15° about the vertical may therefore be easily obtained. By means of the three cranks 11A, beam 3 can thus be made to travel over a surface enveloping a vertical-axis cone having an apex angle of 30°. This easily makes it possible to reach the end of a highly off-center pipeline. It will further be noted from the drawing that the two arms of frame 10 supporting the two legs 11 closest to manhole 20 are slightly bent so as to shift traction apparatus 1 slightly back of manhole 20 and to leave as much free space as possible above the latter.

Apparatus 1 is operated from a control panel 19 connected by ducts (not shown) to a hydraulic power unit, on the one hand, and to motor 15, on the other hand. Control panel 19 can advantageously be placed at any of various points for receiving frame 10 so as to be easily accessible to the operator whatever the layout of the site.

Because beam 3 is fixed directly to frame 10 as described above, the size of frame 10, hence of pulling apparatus 1, can be greatly reduced. This permits another advantageous use of apparatus 1, as shown in FIG. 2.

Figure 2:
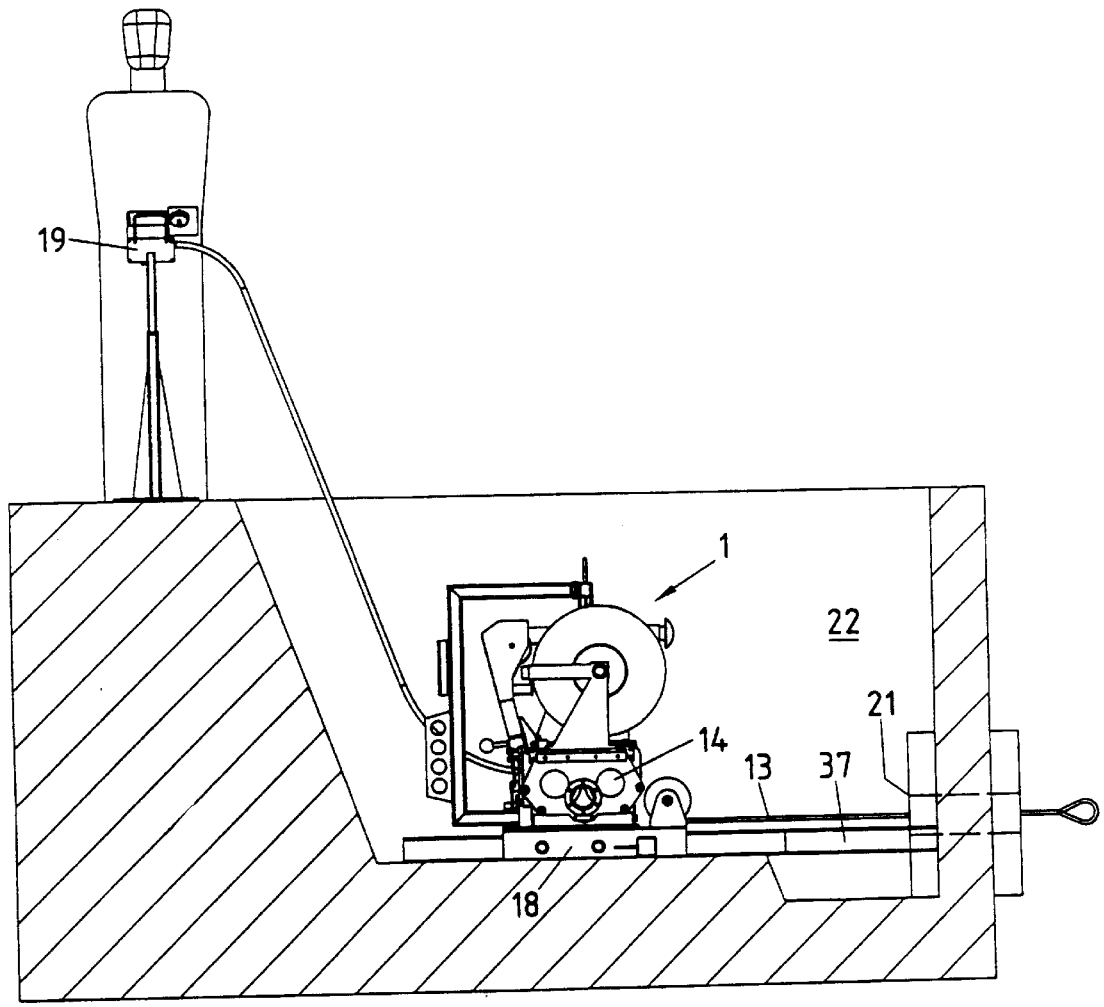
FIG. 2 is an elevation, partially in section, showing the same apparatus as shown in FIG. 1 adapted to a second working position.

FIG. 2 is a sectional view of a chamber 22 or excavation at one end of a pipe 21. Because of the compact size of pulling apparatus 1, this chamber or excavation 22 may be much smaller than a similar chamber or excavation necessary for pulling with known traction apparatus, especially traction apparatus mounted on a trailer. Apparatus 1 as shown in FIG. 2 includes essentially the same elements as previously described, except that legs 11 and their supports have been uncoupled from frame 10. Pulling apparatus 1 has been turned by 90° and set down so that the location where cable 13 enters capstan 14 is directly aligned with pipe 21. Support means 37 engage the same securing stirrup 18 as previously described, which is now horizontal. Thus, the tractive force is transmitted directly to frame 10 via stirrup 18 by support means 37, resting on one side against a stable edge of pipe 21. Support means 37 are secured in stirrup 18 in the same way as described above relative to the securing of the beam. In the embodiment shown in FIG. 2 control panel 19 is disposed at a location where it is easy to check on the pulling operation.

Pulling apparatus 1 has been described as including a drum 12 and a double capstan 14. Any other means by which the desired traction may be obtained can be used. In particular, the drum might serve directly as a traction component, and the capstan could then be omitted. Conversely, if all tractive force is applied by the capstan, whether single or double, and the cable is no longer subjected to strong traction between the capstan and the drum, it would be possible to equip apparatus 1 only with the capstan, in which case the drum would form part of a separate winding apparatus. This last possibility would be advantageous if it were necessary to reduce the size of the pulling apparatus even further, for the winding apparatus could be displaced, especially in cases where great lengths of cable have to be pulled.

Although the apparatus has been described as being used for pulling a traction cable to which an object or a tool is attached, the same apparatus may obviously also be used for laying cable, especially electric cable, or piping.

While the invention has been described with reference to what are considered to be preferred embodiments thereof, it is to be understood that the invention is not limited to the disclosed embodiments or constructions. To the contrary, the invention is intended to cover various modifications and equivalent arrangements included within the spirit and scope of the appended claims.

We claim:

1. An apparatus for pulling a cable, said apparatus comprising:
    a frame;
    a cable pulling device supported by the frame;
    a beam that absorbs tractive stress of the cable,
    a securing device that secures the beam relative to the frame, the securing device forming an integral part of said frame: and
    a level adjuster that adjusts a level of said frame, said level adjuster being usable to set an angle of the beam different from the vertical.

2. The apparatus according to claim 1, wherein the beam can be fixed relative to said securing device in a plurality of positions along a longitudinal axis of the beam.

3. The apparatus according to claim 2, wherein the securing device comprises a stirrup surrounding a portion of said beam at least partially.

4. The apparatus according to claim 1, wherein a return pulley is provided on said beam at an end of said beam remote from said securing device.

5. The apparatus according to claim 4, wherein the end of the beam provided with the return pulley includes a support element securing device that secures a support element, said support element resting against a stable surface surrounding a pipe within which the cable is to be pulled.

6. The apparatus according to claim 4, wherein the return pulley is pivotably mounted on a shaft, said shaft perpendicular to an axis of rotation of said return pulley and parallel to a longitudinal axis of the beam.

7. The apparatus according to claim 6, wherein the return pulley is provided with a shock absorber.

8. The apparatus according to claim 1, wherein the cable pulling device includes a capstan.

9. The apparatus according to claim 8, further including a drum that winds up pulled cable said drum supported on said frame.

10. The apparatus according to claim 1, wherein the cable pulling device includes a drum.

11. The apparatus according to claim 8, further including a controller that controls the cable pulling device, said controller being able to be disposed at a location where it is easy to check on a pulling operation.

12. A method of pulling a cable using the apparatus according to claim 1, said method comprising the steps of:

placing said apparatus above ground level, opposite a manhole of an underground pipe;

positioning the return pulley at the end of the beam opposite an end of said underground pipe; and pulling the cable through the underground pipe.

13. The apparatus to claim 10, further including a controller that controls the cable pulling device, said controller being able to be disposed at a location where it is easy to check on a pulling operation.

* * * * *